US010843154B1

United States Patent
Burton et al.

(10) Patent No.: US 10,843,154 B1
(45) Date of Patent: Nov. 24, 2020

(54) BLAST MITIGATION FOAM CONCENTRATES AND FOAMS MADE THEREFROM

(71) Applicant: National Technology & Engineering Solutions of Sandia, LLC, Albuquerque, NM (US)

(72) Inventors: Patrick D. Burton, Albuquerque, NM (US); Mark D. Tucker, Albuquerque, NM (US); Keith E. Frakes, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 143 days.

(21) Appl. No.: 15/676,628

(22) Filed: Aug. 14, 2017

(51) Int. Cl.
*B01F 17/00* (2006.01)
*C08J 9/00* (2006.01)
*F42D 5/045* (2006.01)

(52) U.S. Cl.
CPC ...... *B01F 17/0092* (2013.01); *B01F 17/0021* (2013.01); *B01F 17/0057* (2013.01); *C08J 9/0033* (2013.01); *F42D 5/045* (2013.01); *C08J 2205/022* (2013.01); *C08J 2305/00* (2013.01); *C08J 2401/28* (2013.01)

(58) Field of Classification Search
CPC ... C08L 1/28; F42D 5/045; F42D 1/26; B01F 17/0028
See application file for complete search history.

(56) References Cited

U.S. PATENT DOCUMENTS

| | | | |
|---|---|---|---|
| 6,553,887 B1 * | 4/2003 | Bureaux | B01F 17/0028 516/10 |
| 7,850,865 B1 * | 12/2010 | Tucker | C08L 1/286 252/3 |
| 7,861,637 B2 | 1/2011 | Leivesley | |
| 2007/0077835 A1 * | 4/2007 | Leivesley | A62D 5/00 442/134 |

* cited by examiner

*Primary Examiner* — Michael A Salvitti
(74) *Attorney, Agent, or Firm* — Daniel J. Jenkins

(57) ABSTRACT

The present disclosure is directed to highly concentrated foam formulations for blast suppression and dispersion mitigation. for use in responding to a terrorism incident involving a blast dispersion device. The foam formulation is more concentrated and more stable than current blast suppression foams, which reduces the logistics burden on the user.

36 Claims, No Drawings

BLAST MITIGATION FOAM CONCENTRATES AND FOAMS MADE THEREFROM

STATEMENT OF GOVERNMENT INTEREST

The United States Government has rights in this invention pursuant to Contract No. DE-AC04-94AL85000 between the United States Department of Energy and Sandia Corporation, and Contract No. DE-NA0003525 between the United State Department of Energy and National Technology & Engineering Solutions of Sandia, LLC, both for the operation of the Sandia National Laboratories.

FIELD OF THE INVENTION

This invention relates generally to foams, and more particularly to blast mitigation foam concentrates having low volatility and high expansion ratios and foam stability.

BACKGROUND

Blast mitigation, suppression, and containment foams, collectively referred to herein as blast foams, are employed for various purposes for limiting damage from explosive devices. For example, a blast foam may be used, dispensed or deployed over an explosive/dispersal device. If the device is initiated, the blast foam contains dispersed material and/or particles and dramatically reduces the blast overpressures thereby reducing damage caused by the blast. This has become increasingly important in reducing the damage to persons and property caused by improvised explosive devices (IEDS) and other clandestine explosive devices.

The current emergency response to an explosive device using blast foams requires transport of a large number of drums of blast foam concentrate. Prior blast foam concentrates are solutions that are foamed such as by drawing the solution into a Venturi nozzle or other foam generator at a set mixing ratio to inline water supplied by a fire hydrant, pumper truck or other water source. Alternatively, the entire volume of water can be added in a batch process, and the solution can be expelled through an air-pressurized foaming device.

Emergency responders have a new objective of substantially reducing the weight required to deploy a blast foam by reducing the amount of blast foam concentrate necessary for the deployment. For example, AFC-380 (an earlier Sandia National Laboratories blast foam concentrate) is prepared in the form of a 6% concentrate. In other words, to deploy 100 gallons of finished/expanded foam, 6 gallons of AFC-380 concentrate is added to 94 gallons of make-up water (obtained from a local source such as a fire hydrant, lake, or stream).

What is needed are improved blast foam concentrates that have reduced volume and similar or greater expansion ratios and foam stability compared to currently available blast foam concentrates.

SUMMARY

The present disclosure is directed to blast foam concentrates that have much lower volatility and equal to or greater expansion ratios and foam stability when formed into a foam solution and foamed than currently available blast foam concentrates. The blast foam concentrates do not rely upon a water-soluble or water-miscible alcohol as a dispersion agent. The blast foam concentrate pastes may be referred to herein as concentrate pastes, concentrates or pastes.

The concentrates include a dispersing agent selected from a group including a glycol selected from a group including glycerin (GLY) (1,2,3-propanetriol), propylene glycol (PG) (1,2-propanediol), hexylene glycol and ethylene glycol in addition to a glycol ether such as diethylene glycol monobutyl ether (DEGMBE) and tripropylene glycol methyl ether.

In an embodiment, a blast foam concentrate is disclosed that includes an anionic surfactant foaming agent, an anionic polymer, a nonionic polymer, a foam stabilizer, a dispersing agent, and water.

In another embodiment, a blast foam concentrate is disclosed that includes 30-50 wt % anionic surfactant foaming agent, 5-15 wt % polymer component comprising an anionic and a nonionic polymer, greater than 0 wt % to 5 wt % foam stabilizer, 25-45 wt % dispersing agent, and 1-4 wt % water.

In another embodiment, a blast foam solution is disclosed that includes a mixture of between 1% and 3% (by volume) blast foam concentrate and remainder (by volume) water. The blast foam concentrate includes an anionic surfactant foaming agent, an anionic polymer, a nonionic polymer, a foam stabilizer, a dispersing agent, and water.

An advantage of the present disclosure is to providing blast foam concentrates with substantially reduced weight to first responders.

Another advantage of the present disclosure is providing blast foam concentrates that reduce the volatile organic content (VOC) by removing the alcohol component, such as found in AFC-380, thereby reducing the transportation and operational burden on the end user.

DETAILED DESCRIPTION

There are two important physical properties for blast foams. First, the blast foam solution must have a relatively large expansion ratio (i.e., the volume of foam generated divided its original liquid volume). To support most applications, the expansion ratio of a blast suppression foam should be between 60:1 and 150:1. The second important physical property is the foam's stability. Foam stability is measured by its drainage rate (i.e., the volume of liquid that drains out of an expanded foam over time). A blast foam should be highly stable (i.e., have a low drainage rate) with a half drainage time of at least one hour.

Foam expansion is dependent on the surface tension within the foam formulation while foam stability has been shown to increase with bulk viscosity of the foaming solution and the surface viscosity of the adsorbed surfactant layer at the air/water interface, which is increased due to close packing of surfactant molecules. Therefore, these properties can be modified in a foam formulation by careful selection of ingredients such as the surfactant and other additives, such as polymers, stabilizers and organic solvents.

According to an embodiment of the disclosure, blast foam concentrates including a mixed surfactant, an optional foam stabilizer, a water-soluble polymer component, water and a dispersing agent are disclosed. No water-soluble or water-miscible alcohol solvents need to be used. For example, the concentrate does not need to include water-soluble or water-miscible alcohol solvents such as, but not limited to isobutanol, tert-butanol, propanol, isopropyl alcohol or other low molecular weight alcohols.

The following is a discussion of the concentrate components according to embodiments of the disclosure.

Mixed Surfactant Foaming Agent

In an embodiment, two or more surfactants of different chain lengths may be mixed to enhance foam stability. It is postulated that mixed surfactants affect the formed foam stability due to their ability to change the 2-D arrangement on the air/water surface. Different chain lengths of surfactants can pack more tightly than only one surfactant. In an embodiment, two anionic surfactants of different carbon chain lengths are components of the disclosed concentrate.

In an embodiment, the first anionic surfactant may be selected from a group including sodium dodecyl sulfate (SDS), carboxylic acid salts, sulfonic acid salts, sulfuric acid ester salts, and phosphoric acid esters. In an embodiment, the first anionic surfactant may be SDS.

In an embodiment, the second anionic surfactant may be selected from a group including alpha olefin sulfonates, carboxylic acid salts, sulfonic acid salts, sulfuric acid ester salts, and phosphoric acid esters. In an embodiment, the alpha olefin sulfonate may be a C14-C16 alpha olefin sulfonate, such as, but not limited to a commercially available C14-C16 alpha olefin sulfonate is known as BIOTERGE®, a product of the Stepan Company.

The concentrate has between about 30 wt % and 50 wt % mixed surfactants. In another embodiment, the mixed surfactant is between about 35 wt % and 45 wt %. In an embodiment, the mixed surfactant is about 40 wt % of the concentrate. In an embodiment, the range of ratios of the first to second anionic surfactants is between about 1:1 and 2:1. In another embodiment, ratio of the first to second anionic surfactant is about 1.2:1.

Water

The inventors have unexpectedly discovered that adding water to the concentrate improves mixability in forming the paste and in forming the final solution by swelling the polymer component to improve the mixability and ease of use of forming and using the foam solution. The amount of water in the concentrate is between about 1 wt % and 4 wt %. In an embodiment, the amount of water is about 3 wt %. It should be appreciated that more water may be used to form the concentrate, but the additional water only forms a more aqueous concentrate, which may be referred to as an intermediate concentrate paste (see discussion below) or the final foam solution that is foamed at the foaming location (see discussion below).

In an embodiment, water may be added by adding the anionic surfactant dispersed in water to the concentrate. In an embodiment, the anionic surfactant may be a mixture of solid and water dispersed anionic surfactants. For example, the anionic surfactant may be a mixture of BIO-TERGE® AS-40 (BT-40), which is an aqueous solution of alpha olefin sulfonate, and BIO-TERGE® AS-90 (BT-90), which is an alpha olefin sulfonate dry powder.

Foam Stabilizer

The concentrate also includes foam stabilizer to increase the relaxation time of bulk phase micelles, and consequently, enhancing foam stability. In an embodiment, the foam stabilizer may be a fatty alcohol. These fatty alcohols are not water-soluble or water-miscible. In an embodiment, the foam stabilizer additive may be a C12-C14 fatty alcohol. In an embodiment, the fatty alcohol is selected from a group including n-dodecanol, n-tetradecanol, n-tridecanol, and n-hexadecanol. The concentrate has more than 0 wt % and less than about 5 wt % additive. In an embodiment, the additive is between about 1 wt % and 5 wt %. In an embodiment, the additive is between 2 wt % and 4 wt %. In an embodiment, the additive is about 3 wt % of the concentrate.

Water-Soluble Polymer Component

Polymers are added to the foam concentrate to increase bulk viscosity. At a given surfactant concentration, the bulk viscosity of the foam forming solution depends on the polymer concentration, the degree of hydrolysis, solution ionic strength, pH, temperature, and other additives. The polymer component includes two or more polymers having different hydration or swelling times. In an embodiment, the two polymers may be an anionic and a nonionic polymer having different hydration or swelling times. In an embodiment, the anionic polymer is a fast hydrating polymer, such as, but not limited to Xanthan Gum (XG), Guar gum, agar, carrageenan, sodium alginate, caseinate, and natural or synthetic polysaccharide polymers. In an embodiment, the nonionic polymer is a slower hydrating polymer, such as, but not limited to 2-hydroxyethylcellulose (HEC), carboxymethyl cellulose, hydroxymethylcellulose, hydroxypropylcellulose, and hydroxypropylmethyl cellulose. In an embodiment, the water-soluble polymer component may be XG and HEC.

The concentrate has between 5 wt % and 15 wt % polymer. In another embodiment, the polymer is between 7 wt % and 12 wt %. In another embodiment, the polymer is 9 wt % of the concentrate. In an embodiment, the ratio of the anionic and nonionic polymers is between 1:1 and 2:1. In another embodiment, the ratio of the first and second nonionic polymers is about 3:2.

The anionic polymer, for example, XG is a thickening agent that contributes to a desired level of viscosity. XG hydrates more readily than HEC.

The nonionic polymer, for example HEC, also provides a thickening agent function and is swelled by the water component of the concentrate more slowly than the anionic polymer, such as XG. When used together, the synergy of these two polysaccharides along with the two surfactants (SDS and BIOTERGE AS-40/90) stabilizes the concentrate to prevent separation of the ingredients at extreme storage temperatures. In the finished foam solution, the combination of the polymers and surfactants gives the foam a larger expansion ratio and higher stability than AFC-380.

Dispersing Agent

A key criterion for the constituent selection for the disclosed concentrate was the dispersability and hydration of the polymer component to assist in the hydration or swelling of the polymer component in water. The inventors of the present disclosure have determined that a dispersing agent including a glycol selected from a group including glycerin (GLY) (1,2,3-propanetriol) and propylene glycol (PG) (1,2-propanediol), hexylene glycol and ethylene glycol in addition to a glycol ether, such as diethylene glycol monobutyl ether (DEGMBE) and tripropylene glycol methyl ether, that allows for the polymer component to be swelled in water without the presence of alcohol, thus reducing the flammability and volatility of the concentrate. In an embodiment, one or more glycols may be used. In an embodiment, two glycols may be used. In an embodiment, GLY and DEGMBE may be used. In an embodiment, PG and DEGMBE may be used. GLY has a near-ambient freezing point and should not be used in cold weather conditions. In some applications, ethylene glycol may not be used due to its higher toxicity.

The concentrate includes between about 25 wt % and 45 wt % dispersing agent. In an embodiment, the amount of dispersing agent is between about 25 wt % and 36 wt %. In an embodiment, the amount of dispersing agent is between about 28 wt % and 32 wt %. In an embodiment, the amount of dispersing agent is about 32 wt %. The amount of glycol in the dispersing agent is between about 8 and 28 wt %, with the remainder DEGMBE.

Glycol was found to improve the miscibility between the aqueous and organic solvents. The HEC did not dissolve in the glycol until the water constituent was added, at which point the polymer hydrated and produced a homogeneous, pourable gel. When the remaining surfactants were added, a wet paste, herein referred to as the concentrate paste or concentrate, was produced.

Intermediate Concentrate

In another embodiment, a diluted, intermediate concentrate paste was formed by adding water in addition to the 1 to 3 wt % water of the concentrate. This may be done to increase the flowability of the concentrate. In an embodiment, an intermediate concentrate was formed by adding water to the concentrate in an amount between greater than 0 wt % and up to 3:1 water to concentrate by weight. In another embodiment, the amount of water added to the concentrate is between about 0.25:1 and 2:1 water to concentrate by weight. In another embodiment, the amount of water added to the concentrate is between about 0.5:1 and 1:1 water to concentrate. The intermediate concentrate paste was able to be educted with conventional equipment (i.e., such as eductors used to deploy AFC-380 in the field).

When conducting foam expansion tests, the paste was diluted with water to produce an intermediate paste concentrate. Foams produced from the intermediate paste concentrate were exceptionally stable, indicating that less concentrate (as compared to AFC-380) could be used to achieve acceptable results.

In an embodiment, a sealed unit of use package is disclosed that includes the concentrate or intermediate concentrate. The use package enables rapid, simple reconstitution. The use package allows concentrate be easily measured and mixed into the correct volume of water with minimal air incorporation, as excessive agitation during mixing was noted to incorporate air into a foam, which could cause cavitation in a liquid pick-up hose during the foam producing step.

Table 1 shows the components of three foam concentrate exemplary formulations according to various embodiments of the disclosure.

| Component | F01-59 | F01-63 | F01-71 |
|---|---|---|---|
| GLY | 9.5 | 25.0 | — |
| PG | — | — | 11.8 |
| DEGMBE | 15.4 | 16.2 | 19.0 |
| HEC | 2.8 | 3.0 | 3.5 |
| DOH | 2.3 | 2.4 | 2.8 |
| XG | 4.2 | 4.4 | 5.3 |
| BT-40 | 47.8 | 25.0 | 29.4 |
| SDS | 13.0 | 18.8 | 22.1 |
| BT-90 | 4.9 | 5.1 | 6.1 |

Example of Method of Forming Concentrate Paste

The following process steps illustrate an exemplary method or process of forming the foam concentrate paste. It would be understood that the scaling of such process to commercially available amounts is well within ordinary skill in the art. The following example was used for the preparation of F01-71 shown in Table 1 above.

Preparation of F01-71 on a 100 g scale:
1. Mix 11.8 g PG with 19.0 g DEGMBE in a beaker and stir briefly.
2. Add 3.5 g HEC and stir until well dispersed.
3. Add 2.8 g DOH and stir.
4. Add 5.3 g XG and stir until well dispersed.
5. Slowly pour 29.4 g BT-40 in a thin stream while stirring slowly. Polymers will gel.
6. Add 22.1 g SDS in small aliquots. Allow powder to incorporate into the gel before subsequent additions.
7. Add 6.1 g BT-90 powder in small aliquots, allowing each aliquot to incorporate into the gel.

The present disclosure is further directed to methods of forming foam solutions and foams from the concentrate. The concentrate ranges from 1% to 3% concentrates, meaning that 1 to 3 parts concentrate are mixed with 99 to 97 parts dilution liquid (parts by volume), respectively, to form the respective blast foam solutions or foam solutions. In another embodiment, concentrates range from 1.5% to 2%.

For example, a 1.5% foam concentrate has a similar expansion ratio and foam stability as compared to AFC-380. This formulation requires 1.5 gallons of foam concentrate to make 100 gallons of finished foam (as compared to 6 gallons of AFC-380 foam concentrate) which reduces the weight burden on the user by approximately 75%. In another embodiment, a 2% blast foam concentrate requires 2 gallons of foam concentrate to make 100 gallons of finished foam as compared to 6 gallons of AFC-380 foam concentrate, reducing the weight burden on the user by approximately 67%.

In an embodiment, the concentrate may be supplied in unit-of-use packaging to be diluted with an equal mass of water in order to reach a fluid viscosity. The paste is removed from the package and added to a requisite amount of water, then stirred slowly to minimize foam formation to form an intermediate paste. Slow stirring is an operational convenience to ensure that the solution remains visible. Excessive froth formation is acceptable, but limits the ability to determine when the entire mass of paste has been dissolved. A transparent mixing vessel is recommended. Once the foam solution (solution) is fully mixed, it is ready for use as a drop-in replacement for AFC-380. It should be understood that the amount of water added to the paste will determine the mass drainage half life, with less water leading to longer half lives, and more water leading to shorter half lives. For example, for the F01-71 formulation shown above, a 1% solution (1 part paste to 99 parts water by volume was shown to have a half life of 54 minutes, a 1.5% solution had a half life of 86 minutes, and a 2% solution had a half life of 206 minutes. If a desired half life of 90 minutes is desirable, an approximate 1.5% solution should be used in forming the foam solution.

According to another embodiment, a solution is formed without forming an intermediate paste by mixing the entire amount of water with the paste. This may be beneficial for deployment with person-portable spraying equipment. In this case, the paste is mixed with 97.5× water by volume, and stirred until fully dissolved. Adding the water slowly while stirring to incorporate is recommended. This will prevent lump formation and decrease the total mixing time required. Once the solution is homogenized, it can be charged to a pressurized spraying system for foam spraying.

The invention being thus described, it will be obvious that the same may be varied in many ways. Such variations are not to be regarded as a departure from the spirit and scope of the invention, and all such modifications, as would be obvious to one skilled in the art, are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A blast foam concentrate, consisting essentially of:
   an anionic surfactant foaming agent;
   an anionic polymer;
   a nonionic polymer;
   a fatty alcohol foam stabilizer;
   a dispersing agent; and
   1-4 wt % water;
   wherein the blast foam concentrate contains no water-soluble or water-miscible alcohols.

2. The concentrate of claim 1, wherein the dispersing agent comprises a glycol and a glycol ether.

3. The concentrate of claim 2, wherein the glycol is selected from the group consisting of glycerin, propylene glycol, hexylene glycol and ethylene glycol.

4. The concentrate of claim 2, wherein the glycol ether is selected from the group consisting of diethylene glycol monobutyl ether and tripropylene glycol methyl ether.

5. The concentrate of claim 1, wherein the anionic surfactant foaming agent comprises a first and a second anionic surfactant.

6. The concentrate of claim 5, wherein the first anionic surfactant is selected from the group consisting of sodium dodecyl sulfate, carboxylic acid salts, sulfonic acid salts, sulfuric acid ester salts, and phosphoric acid esters.

7. The concentrate of claim 5, wherein the first anionic surfactant is sodium dodecyl sulfate.

8. The concentrate of claim 5, wherein the second anionic surfactant is selected from the group consisting of alpha olefin sulfonates, carboxylic acid salts, sulfonic acid salts, sulfuric acid ester salts, and phosphoric acid esters.

9. The concentrate of claim 5, wherein the second anionic surfactant is an alpha olefin sulfonate.

10. The concentrate of claim 1, wherein the anionic polymer is selected from the group consisting of xanthan gum, guar gum, agar, carrageenan, sodium alginate, caseinate, and natural or synthetic polysaccharide polymers.

11. The concentrate of claim 1, wherein the nonionic polymer is selected from the group consisting of 2-hydroxyethylcellulose, carboxymethyl cellulose, polyanionic cellulose, hydroxymethylcellulose, hydroxypropylcellulose, and hydroxypropylmethyl cellulose.

12. The concentrate of claim 1, wherein the fatty alcohol is selected from the group consisting of n-dodecanol, n-tetradecanol, n-tridecanol, and n-hexadecanol.

13. A blast foam concentrate, consisting essentially of:
    30-50 wt % anionic surfactant foaming agent;
    5-15 wt % polymer component comprising an anionic and a nonionic polymer;
    greater than 0 wt % to 5 wt % of a fatty alcohol foam stabilizer;
    25-45 wt % dispersing agent; and
    1-4 wt % water;
    wherein the blast foam concentrate contains no water-soluble or water-miscible alcohols.

14. The concentrate of claim 13, wherein the dispersing agent comprises a glycol and a glycol ether.

15. The concentrate of claim 14, wherein the glycol is selected from the group consisting of glycerin, propylene glycol, hexylene glycol and ethylene glycol.

16. The concentrate of claim 14, wherein the glycol ether is selected from the group consisting of diethylene glycol monobutyl ether and tripropylene glycol methyl ether.

17. The concentrate of claim 13, wherein the anionic surfactant foaming agent comprises a first and a second anionic surfactant.

18. The concentrate of claim 13, wherein the first anionic surfactant is selected from the group consisting of sodium dodecanyl sulfate, carboxylic acid salts, sulfonic acid salts, sulfuric acid ester salts, and phosphoric acid esters.

19. The concentrate of claim 17, wherein the first anionic surfactant is sodium dodecyl sulfate.

20. The concentrate of claim 17, wherein the second anionic surfactant is selected from the group consisting of alpha olefin sulfonates, carboxylic acid salts, sulfonic acid salts, sulfuric acid ester salts, and phosphoric acid esters.

21. The concentrate of claim 17, wherein the second anionic surfactant is an alpha olefin sulfonate.

22. The concentrate of claim 17, wherein the anionic polymer is selected from the group consisting of xanthan gum, guar gum, agar, carrageenan, sodium alginate, caseinate, and natural or synthetic polysaccharide polymers.

23. The concentrate of claim 17, wherein the nonionic polymer is selected from the group consisting of 2-hydroxyethylcellulose, carboxymethyl cellulose, polyanionic cellulose, hydroxymethylcellulose, hydroxypropylcellulose, and hydroxypropylmethyl cellulose.

24. The concentrate of claim 17, wherein fatty alcohol is selected from the group consisting of n-dodecanol, n-tetradecanol, n-tridecanol, and n-hexadecanol.

25. A blast foam solution comprising a mixture of between 1% and 3% (by volume) blast foam concentrate and remainder (by volume) water; wherein the blast foam concentrate consists essentially of:
    an anionic surfactant foaming agent;
    an anionic polymer;
    a nonionic polymer;
    a fatty alcohol foam stabilizer;
    a dispersing agent; and
    water;
    wherein the blast foam concentrate contains no water-soluble or water-miscible alcohols.

26. The concentrate of claim 25, wherein the dispersing agent comprises a glycol and a glycol ether.

27. The concentrate of claim 26, wherein the glycol is selected from a group consisting of glycerin, propylene glycol, hexylene glycol and ethylene glycol.

28. The concentrate of claim 25, wherein the glycol ether is selected from a group consisting of diethylene glycol monobutyl ether and tripropylene glycol methyl ether.

29. The concentrate of claim 25, wherein the anionic surfactant foaming agent comprises a first and a second anionic surfactant.

30. The concentrate of claim 29, wherein the first anionic surfactant is selected from a group consisting of sodium dodecyl sulfate, carboxylic acid salts, sulfonic acid salts, sulfuric acid ester salts, and phosphoric acid esters.

31. The concentrate of claim 29, wherein the first anionic surfactant is sodium dodecyl sulfate.

32. The concentrate of claim 29, wherein the second anionic surfactant is selected from a group consisting of alpha olefin sulfonates, carboxylic acid salts, sulfonic acid salts, sulfuric acid ester salts, and phosphoric acid esters.

33. The concentrate of claim 29, wherein the second anionic surfactant is an alpha olefin sulfonate.

34. The concentrate of claim 25, wherein the anionic polymer is selected from the group consisting of xanthan gum, guar gum, agar, carrageenan, sodium alginate, caseinate, and natural or synthetic polysaccharide polymers.

35. The concentrate of claim 25, wherein the nonionic polymer is selected from the group consisting of 2-hydroxyethylcellulose, carboxymethyl cellulose, polyanionic cellulose, hydroxymethylcellulose, hydroxypropylcellulose, and hydroxypropylmethyl cellulose.

36. The concentrate of claim 25, wherein the fatty alcohol is selected from a group consisting of n-dodecanol, n-tetradecanol, n-tridecanol, and n-hexadecanol.

\* \* \* \* \*